Dec. 1, 1953     W. G. TRIGWELL     2,661,102
TRAY STACKING MACHINE Filed Aug. 30, 1948     9 Sheets-Sheet 1

Fig. 1

INVENTOR
Wm. G. Trigwell
ATTORNEYS

Dec. 1, 1953  W. G. TRIGWELL  2,661,102
TRAY STACKING MACHINE
Filed Aug. 30, 1948  9 Sheets-Sheet 2

Fig. 2

INVENTOR
Wm. G. Trigwell
BY
ATTORNEYS

Dec. 1, 1953  W. G. TRIGWELL  2,661,102
TRAY STACKING MACHINE
Filed Aug. 30, 1948  9 Sheets-Sheet 3

INVENTOR
Wm. G. Trigwell
BY
ATTORNEYS

Dec. 1, 1953 W. G. TRIGWELL 2,661,102
TRAY STACKING MACHINE
Filed Aug. 30, 1948 9 Sheets-Sheet 8

INVENTOR.
Wm. G. Trigwell
BY
ATTYS

Dec. 1, 1953  W. G. TRIGWELL  2,661,102
TRAY STACKING MACHINE
Filed Aug. 30, 1948  9 Sheets-Sheet 9

INVENTOR
*Wm. G. Trigwell*
BY
ATTORNEYS

Patented Dec. 1, 1953

2,661,102

UNITED STATES PATENT OFFICE 2,661,102

TRAY STACKING MACHINE

William G. Trigwell, Capitola, Calif., assignor to Chapman Dehydrator Co., Inc., Modesto, Calif., a corporation of California Application August 30, 1948, Serial No. 46,865

7 Claims. (Cl. 214—6)

This invention is directed to, and it is an object to provide, a novel machine for automatically stacking fruit or vegetable dehydrator trays on cars preparatory to movement through the dehydrator.

Another object of this invention is to provide a tray stacking machine which is operative to deliver trays, from an endless conveyor, into stacked relation on a car in predetermined position in the machine; the car being automatically lowered step by step as the trays stack onto said car whereby the novel feeding mechanism of the machine functions, at all times, in the same horizontal plane, as is desirable.

A further object of the invention is to provide a tray stacking machine, as in the preceding paragraph, wherein said feeding mechanism acts to successively feed the trays from the conveyor onto a receiving frame over the car; such feeding mechanism being controlled by the passage of the trays on the conveyor, and in turn release of trays from the receiving frame, for dropping therefrom and stacking on the car, is responsive to actuation of said feeding mechanism.

An additional object of the invention is to provide a tray stacking machine wherein novel car lowering apparatus is included to accomplish the aforesaid step by step lowering of the car to compensate for increase in the height of a stack of trays on the car.

It is also an object of this invention to provide a tray stacking machine having a car lowering apparatus, as in the preceding paragraph, which includes an elevator, and a novel switching system for the electric motor drive assembly which is associated with such elevator; such switching system being automatically responsive to a tray fed onto the receiving frame, whereby to then cause the drive assembly to effect a corresponding lowering step of the elevator and supported car.

Another object of the instant invention is to provide a tray stacking machine which functions smoothly and positively to stack dehydrator trays on a car; the machine, while in the main automatic, being designed so that the cycle of the machine remains proper even though the trays feed from the endless conveyor with uneven spacing or timing therebetween.

A further object of the invention is to produce a practical and reliable tray stacking machine, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the tray stacking machine comprises an upstanding main frame 1 of open construction, which includes vertical corner posts 2; said main frame 1 being disposed in, and projecting above, a pit 3. The pit 3 is of substantial depth below the floor level 4, and both said pit and the upstanding main frame 1 are elongated transversely of a rail line which intersects the pit intermediate its ends.

The rail line includes rails 5 mounted on the floor on opposite sides of the pit and separate but matching rails 6 on a rectangular elevator 7 mounted in connection with the main frame 1 for vertical travel. The elevator 7 is generally symmetrical to the frame 1 in plan and includes sleeves 8 which run on the corner posts 2 whereby to guide said elevator.

The elevator 7 is adapted to be moved vertically within the upstanding main frame 1 by the following electric motor driven assembly:

The numeral 9 indicates a reversible electric motor mounted beyond one end of the upstanding main frame 1 below the top of the latter; such reversible electric motor 9 driving a cross shaft 10 through the medium of gearing 11. At opposite ends, and in alinement with corresponding end posts 2, the cross shaft 10 is fitted with cable drums 12.

A cable 13 is wound about and extends upwardly from each drum 12 and passes over a direction-changing sheave 14 on the corresponding corner post 2 adjacent its upper end. From each direction-changing sheave 14, the corresponding cable 13 is reeved in hoist relation to the elevator 7 by means including direction-changing sheaves 15, 16, and 17, with each cable anchored to the elevator at opposite ends, as at 18 and 19. When electric motor 9 is run in one direction, the cables 13 unwind from the drums 12 to lower the elevator 7, while reverse travel of said motor and drums winds the cable on the same and raises the elevator.

Figure 1:
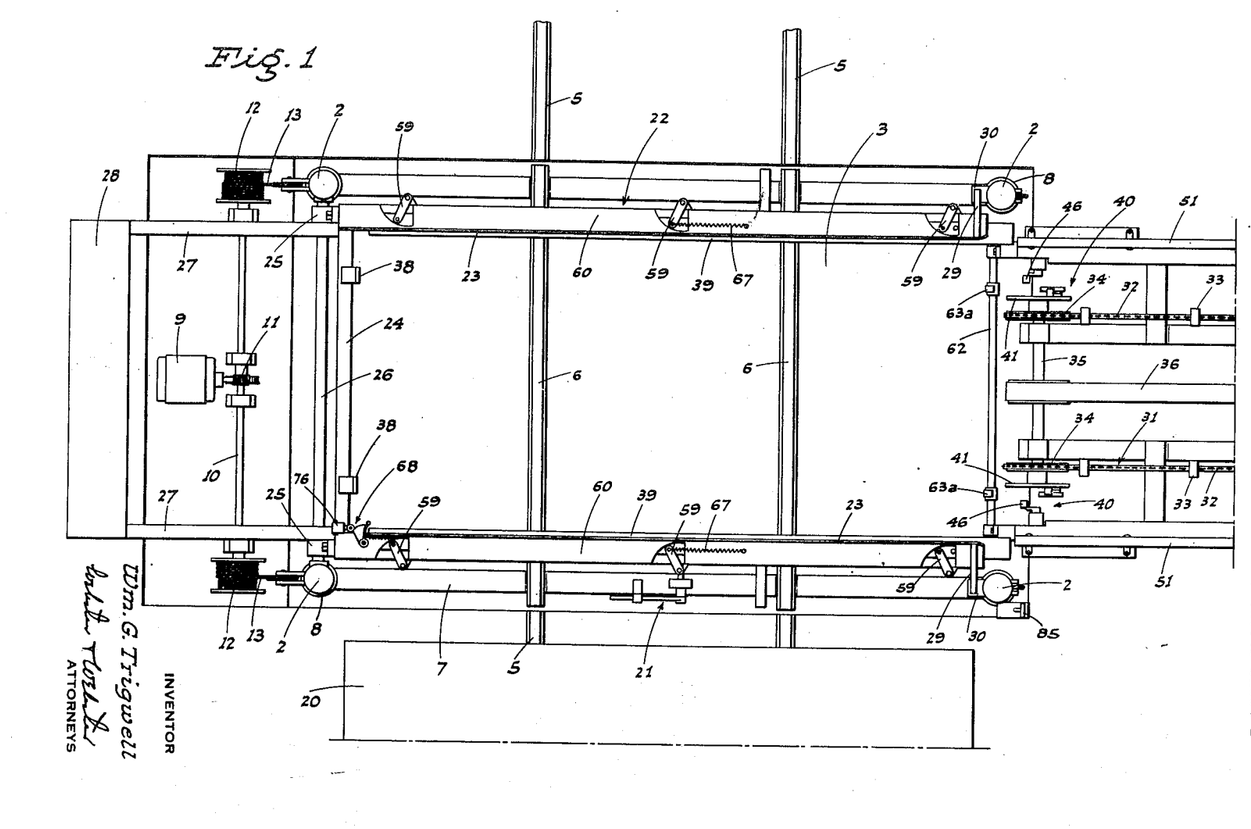
Fig. 1 is a plan view of the tray stacking machine.

When the elevator 7 is disposed at floor level 4, the rails 6 on said elevator aline with the rails 5 on the floor, whereby a dehydrator car 20 can be moved onto the elevator; there being a releasable, car locating stop device 21 on one side of the elevator. In Fig. 1 the car is shown to one side of the tray stacking machine, while in Fig. 2 said car is shown resting on the elevator.

Figure 2:
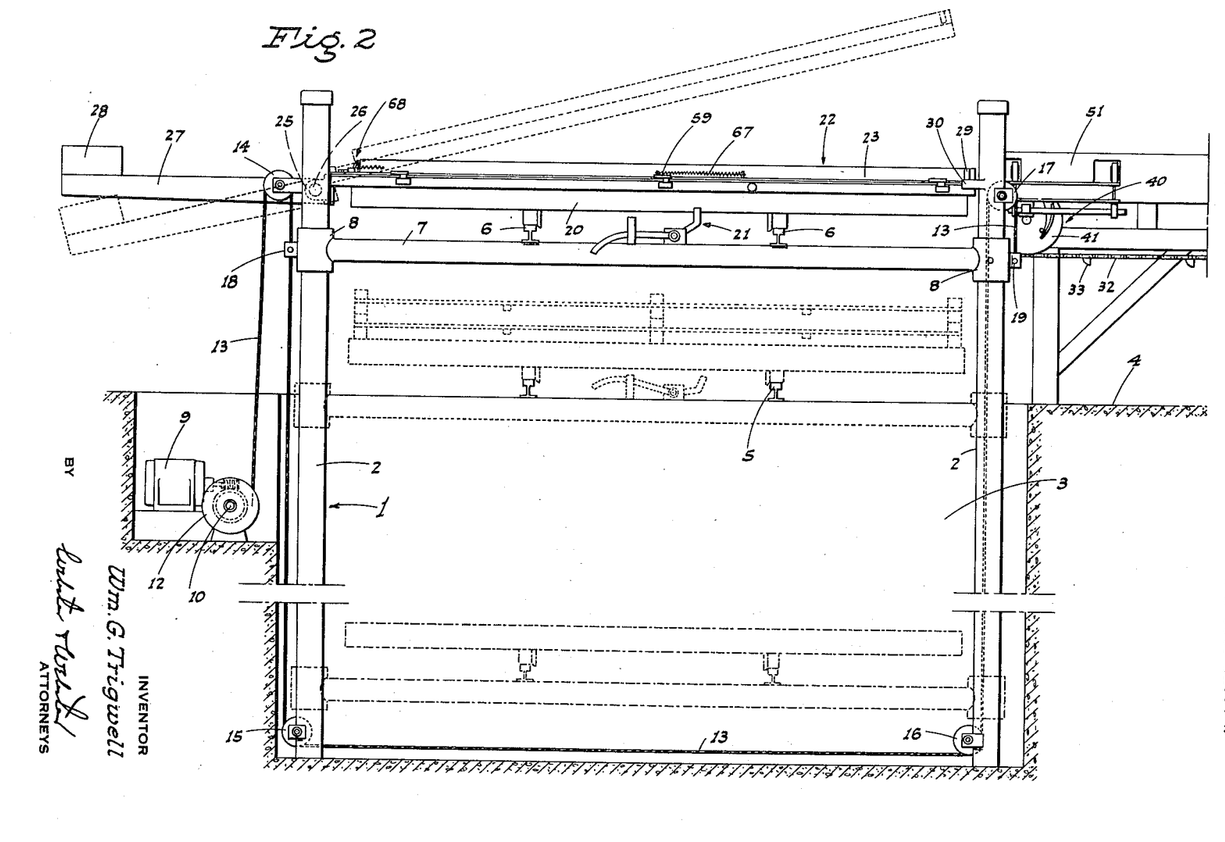
Fig. 2 is a side elevation of the machine.

After a car 20 is run onto the elevator 7, and located in position, the elevator is raised to a starting position, as in full lines in Fig. 2.

Above the horizontal plane of the car 20, when the elevator 7 is in such raised starting position, the machine includes a tray receiving frame, indicated generally at 22, which is elongated lengthwise of the machine; such frame being of generally U-shape, open at what may be termed the inner end of the machine, and closed at the outer end of the machine. The tray receiving frame 22 includes rigid side bars 23 and a rigid cross bar 24.

At its outer end the tray receiving frame 22 is journaled by bearings 25 to a cross shaft 26 which extends horizontally between the corresponding corner posts 2. Arms 27 project outwardly from the outer end of the frame 22 and carry a counter-balance weight 28 whereby to facilitate swinging of the said tray receiving frame 22 from a normally horizontal position upwardly to an out-of-the-way position.

An endless longitudinal conveyor 31 is mounted on the floor 4 and extends lengthwise to a point closely adjacent the inner end of, and in feeding alinement with, the tray receiving frame 22; such conveyor 31 being adapted to feed dehydrator trays in a row, in spaced relation, toward the tray receiving frame 22.

The conveyor 31 includes a pair of transversely spaced, endless conveyor chains 32 which carry tray advancing cleats 33; such chains 32 being trained about driven sprockets 34 at the end of the conveyor adjacent the tray receiving frame 22. The sprockets 34 are secured on a cross shaft 35 driven, intermediate its ends, as at 36.

When each tray 37 is fed off the discharge end of the conveyor 31, such tray is disposed mainly on the tray receiving frame 22, except for a trailing end portion of said tray. It is thus necessary to provide for supplementary feeding to further advance the tray to its full-on position on the frame 22, wherein the outer end of the tray abuts stops 38 on the rigid cross member 24. The frame 22 includes, in cooperation with the rigid side bars 23, longitudinal ledges 39 which are normally advanced inwardly to a partially exposed position to receive and support the tray.

A pair of supplementary tray feeding mechanisms, each indicated generally at 40, are embodied in the machine at the discharge end of the conveyor 31; said mechanisms being disposed laterally outwardly of corresponding sprockets 34 and driven by adjacent ends of the cross shaft 35. As such supplementary tray feeding mechanisms 40 are identical in structure and function, a description of one will suffice for both:

Laterally outwardly of the corresponding sprocket 34, the driven cross shaft 35 is fitted with a disc 41 which carries an L-shaped dog 42 in pivotally mounted relation eccentric to the disc axis; the dog being pivoted, intermediate its ends, to the disc, as at 43. With each revolution of the disc 41 in the direction indicated by the arrow in Figs. 6 and 7, the pivotally mounted dog 42 hangs free except at the top and forward quarter of each revolution; there being a stop pin 44 positioned to prevent undue inward swinging of said dog.

Figure 6:
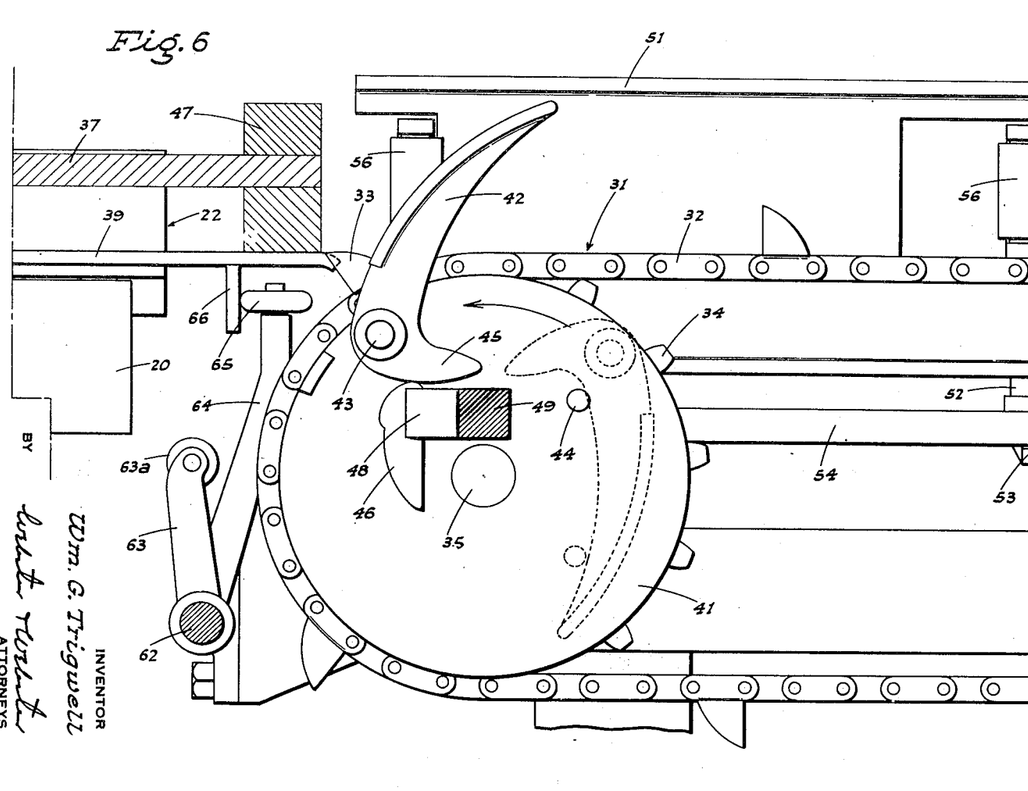
Fig. 6 is an enlarged fragmentary sectional elevation of said one feeding mechanism at the start of a tray feeding operation.
Figure 7:
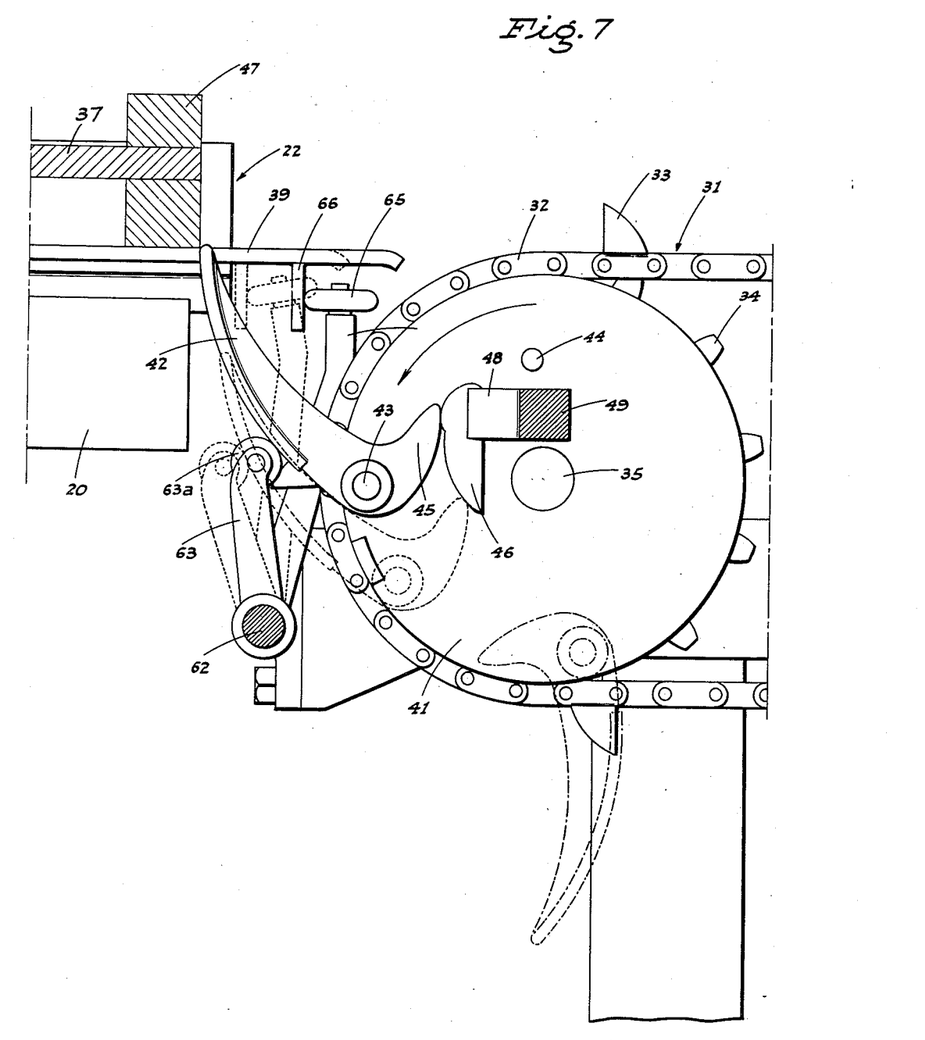
Fig. 7 is a similar view but shows said feeding mechanism at the end of a tray feeding operation.
Figure 8:
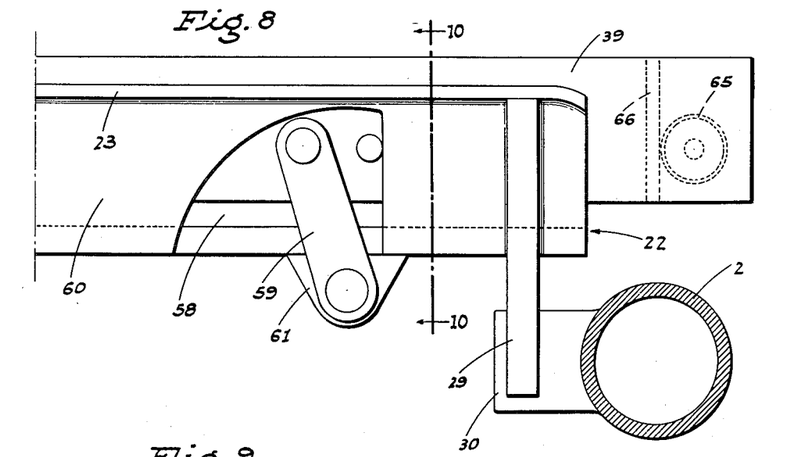
Fig. 8 is an enlarged fragmentary plan view of one end portion of the tray receiving frame, showing the corresponding tray supporting ledge advanced.
Figure 9:
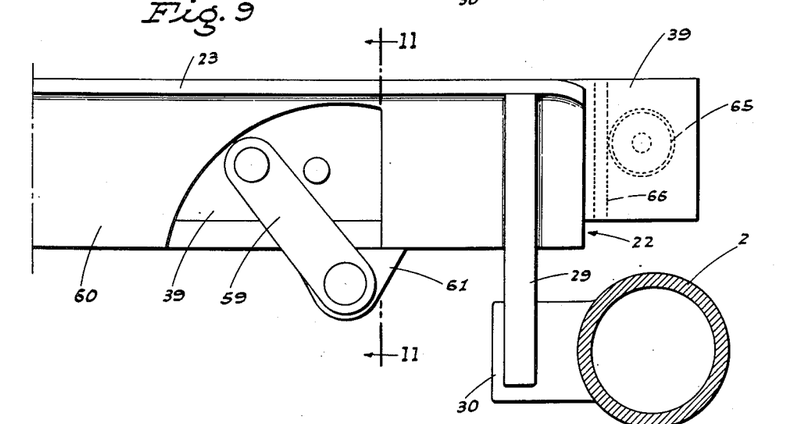
Fig. 9 is a similar view but shows the ledge retracted.
Figure 10:
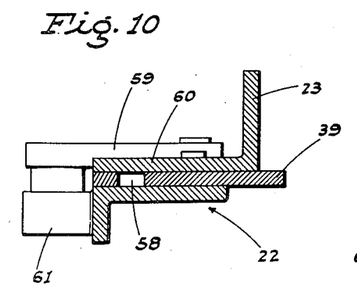
Fig. 10 is a cross section on line 10—10 of Fig. 8.
Figure 11:
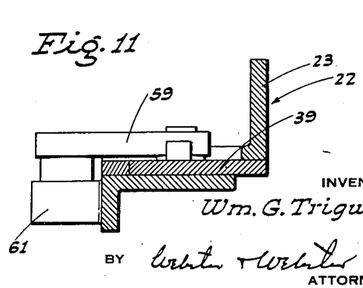
Fig. 11 is a cross section on line 11—11 of Fig. 9.

As the pivot 43 of the dog 42 moves slightly ahead of top dead-center position, as in Fig. 6, the foot 45 of said dog 42 rides onto a cam 46 generated in a design adapted to cause the dog 42 to swing to a position projecting outwardly from the disc 41. With continued travel of said disc 41, the dog 42 swings forwardly and downwardly, as in Fig. 7, engaging the trailing end 47 of a tray on the receiving frame 22, whereby to advance said tray to its full-on position on such frame, and against the stops 38.

The cam 46 is normally in the path of travel of the dog 42, being mounted on a lateral extension 48 of a transverse arm 49 which extends in axially slidable, but non-rotatable, relation through a guide 50 secured in connection with the bottom of a side bar 51 which extends along the adjacent side of the conveyor 31.

It is desired that the cam 46 be shifted laterally, out of the path of the dog 42, whereby the latter will be inoperative and not project, when a tray is passing over the disc 41, as otherwise the dog would project and dislocate the tray. The aforesaid shifting of the cam 46 to an out-of-the-way position is accomplished as follows:

A pair of longitudinally spaced, vertical spindles 52 are journaled outwardly of the side bar 51, and at their lower ends said spindles 52 include generally radial levers 53 which extend forwardly and inwardly to pivotal connection with a longitudinal bar 54, which bar slidably engages through the arm 49 adjacent its free end. At their upper ends the vertical spindles 52 are fitted with yokes 55 which extend forwardly and inwardly through openings in the side bar 51, and laterally inwardly of said bars 51 the yokes 55 are fitted with vertical rollers 56.

Figure 3:
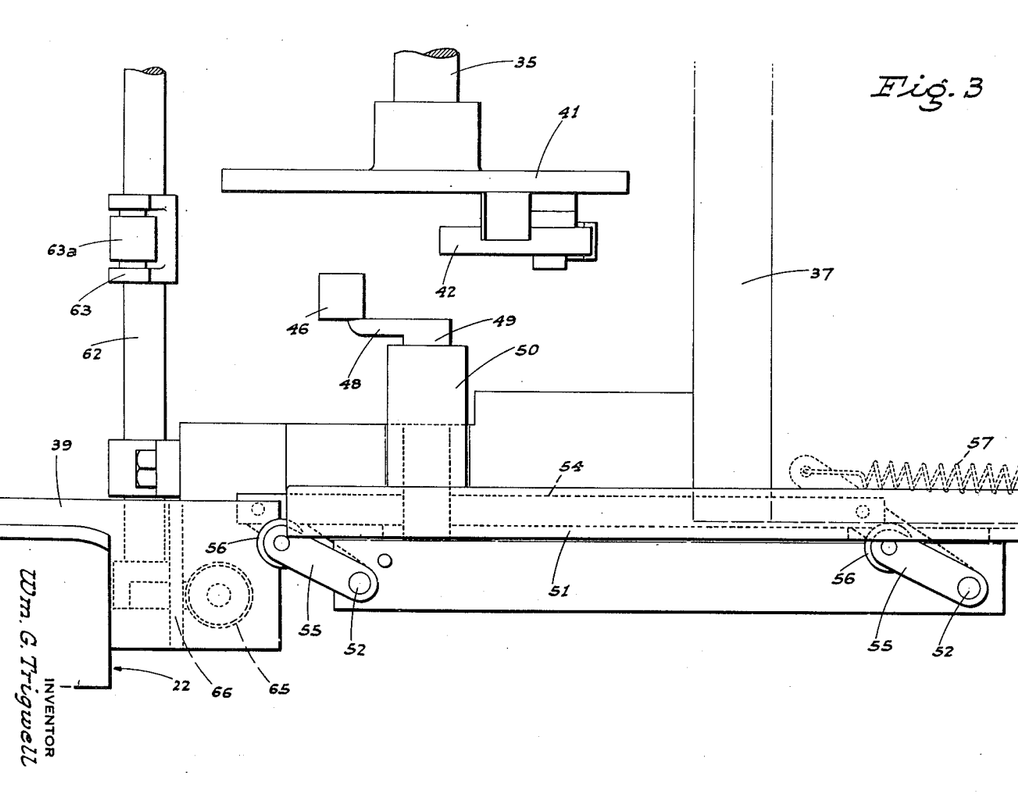
Fig. 3 is an enlarged fragmentary plan view of one tray feeding mechanism with the parts in the positions occupied thereby upon approach of a tray to the end of the conveyor, but before the start of the feeding operation.
Figures 4, 5:
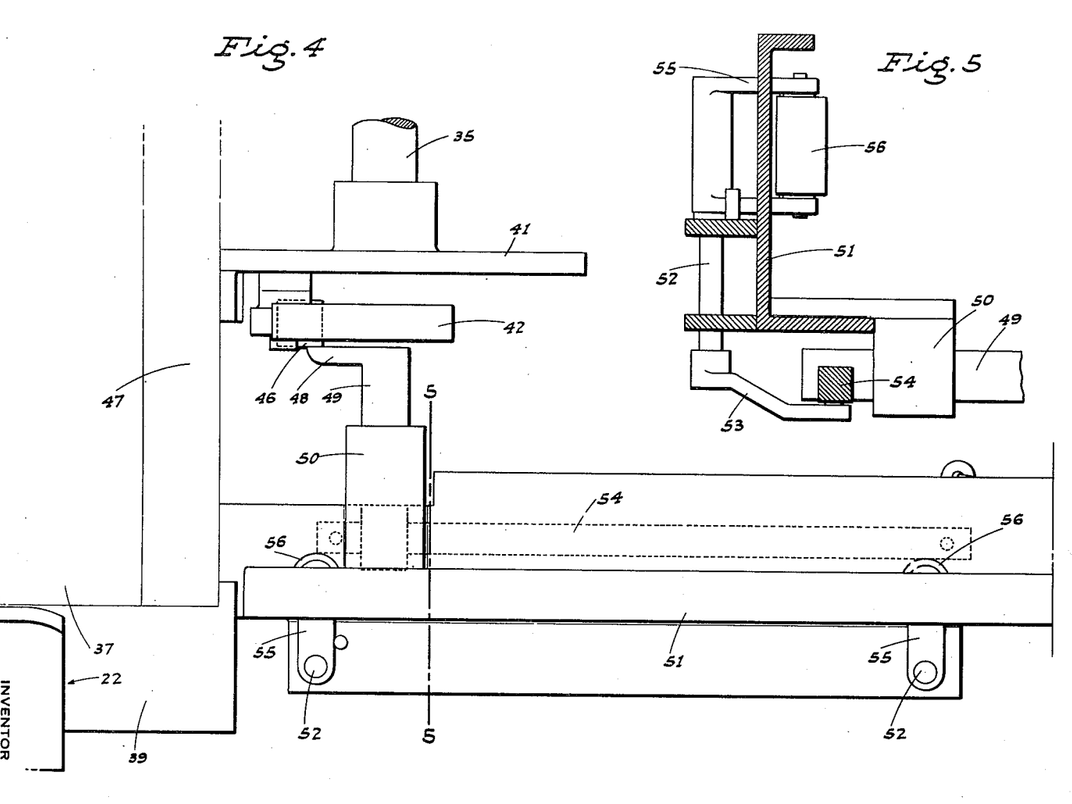
Fig. 4 is a similar view but shows the feeding mechanism in operation; the tray having been fed from the conveyor onto the tray receiving frame.
Fig. 5 is a cross section on line 5—5 of Fig. 4.

As a tray 37, traveling on the conveyor 31, approaches its discharge end, the rollers 56 are engaged by the tray and thrust laterally outwardly, as in Fig. 3, rotating the vertical spindles 52 to such extent that the radial levers 53 swing in a direction to move the longitudinal bar 54 laterally outwardly along with the arm 49 and the cam 46 carried thereby. Thus, as a tray sweeps over the discharge end of the conveyor 31, the dog 42 swings freely about its pivot 43, traversing a path below the tray.

This condition prevails until the tray is discharged from the conveyor 31, at which time the tray has fully escaped the rollers 56 so that the dog 42, as it next travels through the upper and forward quarter revolution, is cam-actuated to accomplish the aforesaid supplementary advance of the tray 37 by engaging its trailing end 47 in the manner previously explained. As soon as a tray discharges from the conveyor 31 and escapes the rollers 56, a tension spring 57, connected to an extension of one of the radial levers 53, causes said levers to swing in a direction to advance the arm 49 laterally inwardly to place the cam 46 in its operative or dog engaging position.

Each tray 37, when in full-on position on the tray receiving frame 22, is supported by the normally laterally inwardly advanced ledges 39, which ledges are mounted and function as follows:

The ledges 39 are flat longitudinal plates engaged in laterally slidable relation in grooves 58 in the rigid side bars 23; there being a longitudinal row of spaced parallel links 59 connected between each ledge 39, through a cut-out in the top flange 60 of the corresponding side bar 23, and a boss 61 at the rear of said side bar. The parallel links 59 of each row are disposed at a forward and inward inclination so that upon longitudinal shifting of the corresponding ledge 39 in a direction away from the conveyor 31, said ledges automatically retract full into the groove 48; dropping the previously supported tray onto the car 20 disposed symmetrically below the tray receiving frame 22.

Such longitudinal shifting of the ledges 39, to retract the same and cause the dropping of a supported tray, is accomplished by mechanism actuated by the dogs 42 after the same have effected the supplementary feeding of said tray but before such dogs escape the corresponding cams 46. Such mechanism comprises the following:

Directly ahead of the discharge end of the conveyor 31 there is a cross shaft 62 journaled in connection with the side bars 51 and having upstanding radial levers 63 in the path of the dogs 42 when the latter are cam projected; said levers 63 including outer end rollers 63a.

When the dogs 42 complete the supplementary feeding action of a tray 37 and escape the trailing end of said tray, said dogs—as they continue downward travel—engage and swing the levers 63 forwardly. When this occurs there is a corresponding forward swinging motion of other upstanding radial levers 64 on opposite ends of the cross shaft 62; the levers 64 having rollers 65 on their upper ends which bear against lugs 66 on ledges 39. When the rollers 65 swing forwardly against the lugs 66, there is a corresponding longitudinal shifting movement of the ledges 39 and automatic retraction thereof to drop the supported tray onto the car 20. As soon as the dogs 42 escape the radial levers 63, the same assume their starting position, by reason of the fact that the ledges are longitudinally rearwardly urged by means of tension springs 67 connected to certain ones of the parallel links 59.

Figures 12, 13, 14:
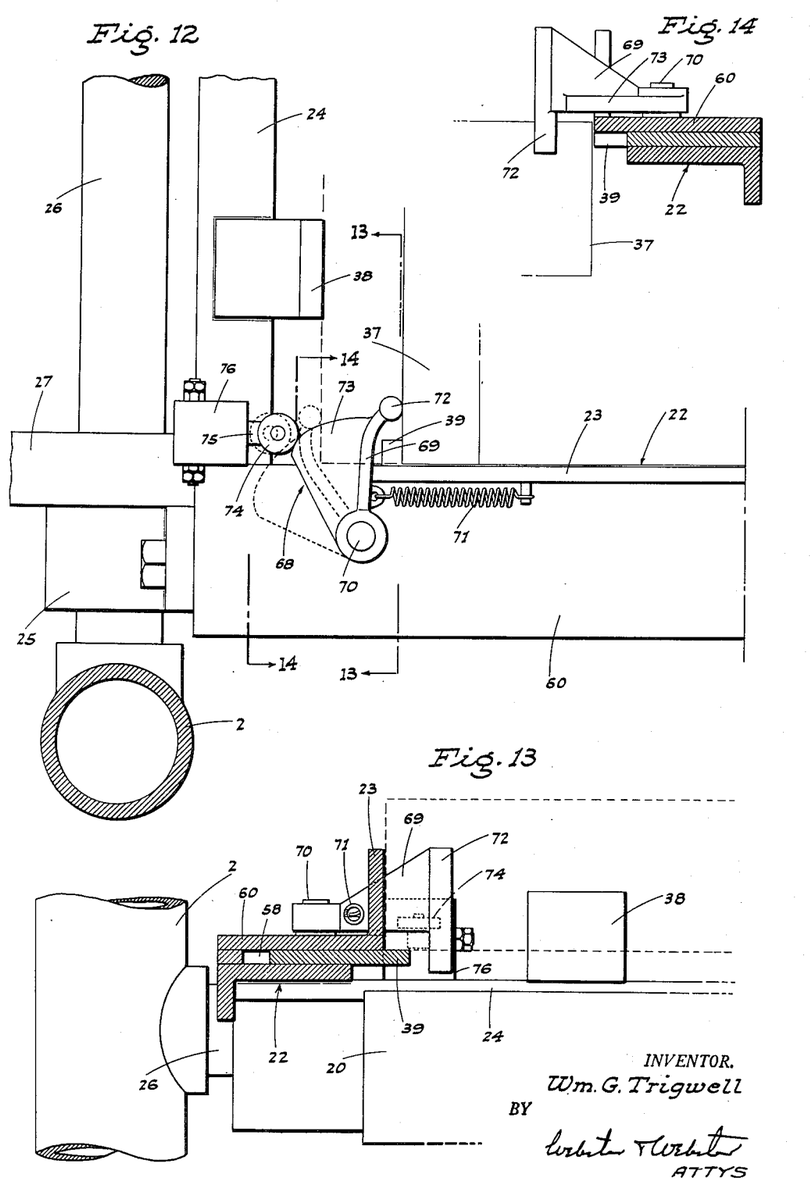
Fig. 12 is a fragmentary plan view of the tray receiving frame at the end opposite the endless conveyor, and shows the tray actuated switch unit which controls the step by step lowering motion of the elevator and car thereon.
Fig. 13 is a cross section on line 13—13 of Fig. 12.
Fig. 14 is a cross section on line 14—14 of Fig. 12.

As each tray 37 is fed onto the tray receiving frame 22, it causes the reversible electric motor 9 to be energized to run in a direction to lower the elevator 7 one step, corresponding generally to the thickness of the tray, and which tray drops onto the car 20, in the manner previously described. This result is accomplished as follows:

At the outer end of the tray receiving frame 22, and disposed in one corner thereof, is a tray actuated switch unit, indicated generally at 68. This switch unit comprises a web-like arm 69 pivoted on the corresponding side bar 23 at the top, as at 70, and normally projecting laterally inwardly therefrom. The web-like arm 69 is urged, by a tension spring 71, in a direction contra to movement of the trays onto the frame 22. At its laterally inner end the web-like arm 69 includes a vertical pin 72 of substantial height disposed in the path of the outer end of a tray moving on the frame 22 and approaching, but short of, the stops 38. The vertical pin 72 projects downwardly to a termination in a horizontal plane somewhat below the bottom of a tray on the frame 22 (see Fig. 13).

A horizontal cam 73 projects forwardly from the web-like arm 69 for engagement with a roller 74 on the outer end of a plunger 75 of a normally spring-opened switch 76. Upon forward swinging motion of the web-like arm 69, the cam 73 engages and advances the roller 74 and plunger 75, closing the switch 76. Further, the cam, as long as the arm 69 is swung forwardly, holds the roller 74 and plunger 75 in a switch closing position.

The normally spring-opened switch 76 is interposed in a reversing circuit 77 connected to the electric motor 9; such switch 76 being in the side of the circuit 77 which causes the electric motor 9 to run in an elevator lowering direction.

Thus, as each tray is fed onto the tray receiving frame 22, the outer end of such tray engages the pin 72 and causes closing of the switch 76 during the final motion of the tray onto said frame 72; the cam 73 holding the switch 76 closed as long as the tray remains on the frame 22, which is only a few moments because the ledges 39 almost immediately retract to drop the tray onto the car 20. While the tray remains full on the frame 22, the switch 76 is closed, and the reversible electric motor 9 runs in a direction to effect downward lowering of the elevator 7 and car 20. Immediately upon the tray 37 being released by retraction of the ledges 39 to drop onto the car 20, said tray escapes the pin 72, and the spring 71 swings the web-like arm 69 rearwardly with respect to the roller 74, whereupon the switch 76 automatically opens, stopping the electric motor 9. In this manner there is an automatic step-by-step downward lowering of the elevator 7 and car 20 thereon with successive feeding of trays 37 onto the tray receiving frame 22. Consequently, as the stack of trays on the car 20 increases in height, the car is automatically and correspondingly lowered until the stack is complete, at which time the elevator and car will be adjacent the bottom of the pit 3.

After a stack of trays is completed on the elevator supported car 20, the endless conveyor 31 is stopped, and the following switching arrangement is brought into play to raise the elevator from within the pit first to floor level for removal of the loaded car and placement of an unloaded car; the frame 22 being swung upwardly to an out-of-the-way position before the loaded car is raised, so that the stack of trays thereon does not strike said frame. After such removal of the loaded car from the elevator, and placement of an unloaded car thereon, the frame 22 is swung downwardly to its normal horizontal position and thereafter the elevator is raised to its starting position closely adjacent the tray receiving frame 22.

The aforesaid switching arrangement, by means of which the above is accomplished, comprises a pair of vertically spaced, snap-action levers 78 and 79 which are pivoted at 80 and 81, respectively, to a vertical frame 82 which upstands in adjacent parallel relation to one of the corner posts 2 at the inner end of the machine. The snap action levers 78 and 79 project toward but extend alongside the adjacent corner post 2 and are disposed in the path of a laterally outwardly projecting pin 83 on the elevator sleeve 8 which runs on said corner post 2.

A manually actuated control rod 84, including a top hand knob 85, projects through the top of the vertical frame 82; there being spaced stop collars 86 which limit the throw of said rod 84. At its lower end the control rod 84 is pivotally connected, as at 87, to the upper snap action lever 79 intermediate its ends.

A connecting rod unit 88 pivotally connects between the upper and lower snap action levers 78 and 79 intermediate the ends of the latter, and said unit includes a spring assembly 89 which permits of upward yielding of the lower snap action lever 78 independently of the upper snap action lever 79, but normally tends to maintain said snap action levers parallel.

Figure 15:
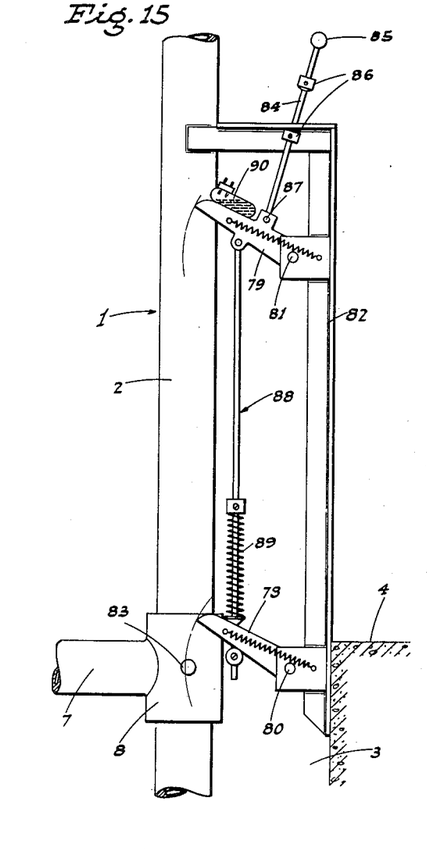
Fig. 15 is a fragmentary elevation of the actuating mechanism for the switch which controls upward motion of the elevator; said mechanism being in its normal position with the switch open.

The normal position of the snap action levers 78 and 79 is raised, as in Fig. 15, and a mercury type contact switch 90 is mounted on the snap action lever 79, being open when said lever is raised. The switch 90 is interposed in the reversing circuit 77 on the side opposite the elevator lowering control switch 76, and comprises the elevator raising control switch. In other words when the normally open switch 90 is closed, the electric motor 9 is energized to run in a direction to raise the elevator 7.

Figure 16:
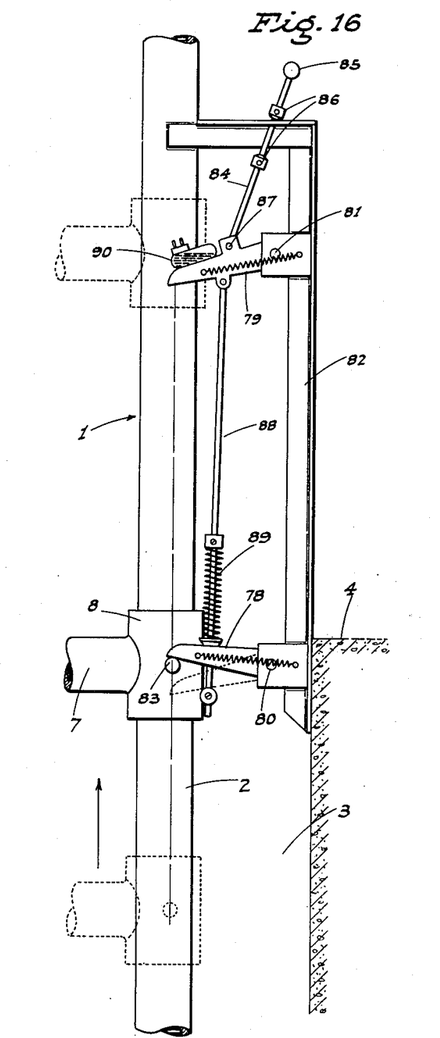
Fig. 16 is a similar view but shows said mechanism in an operative position with the switch closed.
Figure 17:
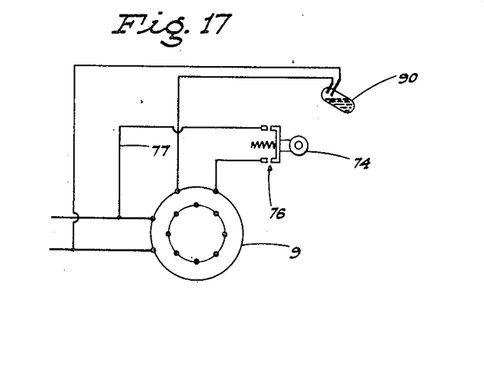
Fig. 17 is a diagrammatic representation of a reversing circuit for the motor; said circuit including the downward motion and upward motion control switches for the elevator.

With the elevator 7 in the bottom of the pit and supporting a stack loaded car 20, the operator thrusts the control rod 84 downwardly, which swings the lever 79 to its full-line position of Fig. 16 and the lever 78 to its dotted-line position of said figure. When this occurs switch 90 closes, and the motor 9 raises the elevator 7. When said elevator reaches the floor level 4, pin 83 strikes the snap action lever 78 and urges it upwardly, along with the control rod unit 88 and the snap action lever 79, whereupon the switch 90 is opened and the motor 9 stops. The loaded car is then run from the elevator rails 6 onto the floor rails 5, and an unloaded car is placed on the elevator. Then the operator again thrusts the control rod 84 downwardly to close the switch 90, whereupon the motor 9 again raises the elevator, which motion continues until the pin 83 engages and actuates the lever 79 to its normal switch opening position, as in full lines in Fig. 15. Upon this occurrence, the switch 90 opens and the motor stops, with the elevator at its raised or starting position. The pin 83, upon such further raising of the elevator, may pass by the lever 78, for the reason that the latter is upwardly yieldable through the medium of the spring assembly 89.

With the described switching arrangement, the operator has full control of initiating the raising motion of the elevator, both from within the pit and at floor level, but stopping of said elevator at floor level, and at its initial starting position thereabove, is automatic.

When the elevator 7, with an unloaded car 20 thereon, is returned to the elevated, initial starting position, the conveyor 31 is again placed in operation, whereupon the cycle of stacking trays on the car is repeated.

The described tray stacking machine is so arranged that the sequence of its operations is smooth and well timed, yet without requiring any predetermined spacing of the trays on the conveyor 31. The machine operates smoothly and reliably for the intended purpose, and is so designed that it requires a minimum of maintenance or repair.

From the foregoing description it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful, and upon which Letters Patent are desired:

1. A tray stacking machine comprising a tray conveyor, an open frame mounted beyond the discharge end of the conveyor for the reception of trays one at a time from the conveyor and to then support each tray in a predetermined position, the frame including normally laterally inwardly advanced but laterally outwardly retractable ledges on opposite sides thereof which engage in supporting relation below each tray in said position, a stack support below the frame disposed to catch dropped trays in a stack thereon, the ledges being longitudinal members slidable in said direction, means connected to the ledges to cause the same to retract and release a supported tray upon longitudinal sliding of the ledges, and means to effect said longitudinal sliding of the ledges in timed relation to reception of a tray on the frame in said predetermined position; there being a supplementary feeding mechanism mounted to advance conveyor discharged trays onto the frame and to said predetermined position, and said means which effects longitudinal sliding of the ledges being actuated by said mechanism.

2. A tray stacking machine comprising an endless conveyor, a frame disposed beyond the discharge end of the conveyor adapted to releasably receive conveyor discharged trays for stacking, and a supplementary, tray feeding mechanism mounted to act on conveyor discharged trays to advance the same to a predetermined position on the frame beyond any point of advance by said conveyor; said supplementary, tray feeding mechanism including a driven cross shaft adjacent the discharge end of the conveyor, and a rotary unit on the cross shaft including a member adapted, upon rotation of said unit, to project and engage each conveyor discharged tray at the rear end to impart supplemental forward motion to said tray; the frame including normally projected but retractible ledges which receive each tray, and means actuated by said supplementary feeding mechanism, after advancing each tray, operative to then retract the ledges so that such tray drops from the frame for stacking.

3. A tray stacking machine comprising an endless conveyor, a frame disposed beyond the discharge end of the conveyor adapted to releasably receive conveyor discharged trays for stacking, and a supplementary, tray feeding mechanism mounted to act on conveyor discharged trays to advance the same to a predetermined position on the frame beyond any point of advance by said conveyor; said supplementary, tray feeding mechanism including a driven cross shaft adjacent the discharge end of the conveyor, a rotary unit on the cross shaft including a member adapted, upon rotation of said unit, to project and engage each conveyor discharged tray at the rear end to impart supplemental forward motion to said tray, and mechanism actuated by a tray passing over the rotary unit to place the member out of operation until the tray reaches a position clear of the unit.

4. A tray stacking machine comprising an endless conveyor, a frame disposed beyond the discharge end of the conveyor adapted to releasably receive conveyor discharged trays for stacking, and a supplementary, tray feeding mechanism mounted to act on conveyor discharged trays to advance the same to a predetermined position on the frame beyond any point of advance by said conveyor; said supplementary, tray feeding mechanism including a driven cross shaft adjacent the discharge end of the conveyor, a rotary member mounted on the driven cross shaft, a dog pivoted on the rotary member for projecting beyond the periphery thereof, a cam mounted in position to engage the foot of the dog and cause said projection of the latter through a predetermined portion of each revolution, whereby the dog then engages a corresponding conveyor discharged tray at the rear end to impart supplemental forward motion to said tray; the cam being mounted for shifting motion out of the path of the foot of the dog, and mechanism actuated by a tray passing over the rotary member and dog operative to so shift the cam and place the dog out of operation until the tray reaches substantially the point of discharge from the conveyor.

5. A tray stacker comprising in combination with a stack receiving instrumentality, a rigid frame disposed above said instrumentality, a pair of laterally spaced apart ledges to support a tray mounted on opposite sides of said frame for movement between a normal tray supporting position and a non-supporting position, the ledges normally projecting inward of said sides, conveying means for advancing a tray onto said ledges to a predetermined position when the ledges are in such normal position, means to move the ledges to said non-supporting position after the tray is so positioned on the ledges, the conveying means including a driven endless conveyor operative to push a tray to a first position part way onto the ledges, and other driven means operative to then push the tray to such predetermined position; such other means including a shaft connected in driving relation with the endless conveyor, discs fixed to the shaft, L-shaped dogs pivotally mounted on the faces of the discs at points eccentrically of the central axes of the discs, and cams fixed at points separate from the discs and effective upon rotation of the discs to engage one leg of the L-shaped dogs and swing the other legs into contact with the end of the tray as it stands in said first position and complete its movement to said predetermined position.

6. A stacker as in claim 5 in which the means for sliding the ledges includes a lever means mounted at points between the discs and the adjacent ends of the ledges and engaging the latter, the dogs engaging and operating said lever means to slide said ledges in a diagonal direction after the dogs have moved the tray to said predetermined position, links pivoted at one end to the frame at points laterally out from the ledges and such links being normally yieldably held in a position transversely of the ledges, the other ends of the links being pivoted to the ledges.

7. A stacker as in claim 6 in which the lever means includes a shaft, one pair of lever arms fixed to the shaft and being engageable by the said legs of the dogs, and another pair of lever arms fixed to the shaft and having their free ends engageable with the ledges.

WILLIAM G. TRIGWELL.

References Cited in the file of this patent

UNITED STATES PATENTS

| Number | Name | Date |
|---|---|---|
| 504,589 | Kaime | Sept. 5, 1893 |
| 842,741 | Young | Jan. 29, 1907 |
| 983,892 | Graham | Feb. 14, 1911 |
| 1,216,832 | Melown | Feb. 20, 1917 |
| 1,331,208 | O'Brien | Feb. 17, 1920 |
| 1,427,490 | Matsushita | Aug. 29, 1922 |
| 1,466,177 | Lacke | Aug. 28, 1923 |
| 1,490,594 | De Lateur | Apr. 15, 1924 |
| 1,809,076 | Shinn et al. | June 9, 1931 |
| 2,039,203 | Ogilvy-Webb | Apr. 28, 1936 |
| 2,065,674 | Fay, Jr. | Dec. 29, 1936 |
| 2,113,926 | Pierce | Apr. 12, 1938 |
| 2,164,371 | Ajello | July 4, 1939 |
| 2,207,349 | Laxo | July 9, 1940 |
| 2,333,479 | Graf | Nov. 2, 1943 |
| 2,341,793 | Keil | Feb. 15, 1944 |
| 2,401,592 | Von Stocker | June 4, 1946 |